(12) United States Patent
Bardagi et al.

(10) Patent No.: US 6,935,098 B2
(45) Date of Patent: Aug. 30, 2005

(54) TURBOMACHINE NOZZLE WITH NOISE REDUCTION

(75) Inventors: Thierry Bardagi, Evry (FR); Alain Dravet, Chevilly-Larue (FR); Marc Doussinault, Le Mee sur Seine (FR)

(73) Assignee: SNECMA Moteurs, Paris (FR)

( * ) Notice: Subject to any disclaimer, the term of this patent is extended or adjusted under 35 U.S.C. 154(b) by 0 days.

(21) Appl. No.: 10/853,234

(22) Filed: May 26, 2004

(65) Prior Publication Data

US 2005/0138915 A1   Jun. 30, 2005

(30) Foreign Application Priority Data

May 28, 2003  (FR)  .................................. 03 06484

(51) Int. Cl.[7] .............................. F02K 1/38; F02K 1/46; F02K 3/02
(52) U.S. Cl. .............................. 60/262; 60/770; 60/263; 239/127.3; 181/213
(58) Field of Search .......................... 60/262, 263, 770; 239/265.17, 265.19, 265.23, 127.3; 181/213, 181/220, 221, 218

(56) References Cited

U.S. PATENT DOCUMENTS

| | | | | |
|---|---|---|---|---|
| 3,153,319 A | * | 10/1964 | Geoffrey et al. | 239/265.19 |
| 3,192,713 A | * | 7/1965 | Baird | 239/265.39 |
| 3,455,413 A | * | 7/1969 | Henley | 181/213 |
| 3,578,106 A | * | 5/1971 | Ellis | 181/220 |
| 3,592,291 A | * | 7/1971 | Medawar et al. | 181/220 |
| 3,696,617 A | * | 10/1972 | Ellis | 60/229 |
| 3,710,890 A | * | 1/1973 | True et al. | 181/215 |
| 3,815,360 A | * | 6/1974 | Wellinitz | 60/264 |
| 3,934,675 A | * | 1/1976 | Lear | 181/220 |
| 4,045,957 A | * | 9/1977 | DiSabato | 60/262 |
| 4,052,847 A | * | 10/1977 | Rodgers et al. | 60/262 |

(Continued)

FOREIGN PATENT DOCUMENTS

FR    1 084 419 A    1/1955

(Continued)

OTHER PUBLICATIONS

Search Report for FR 0306484, Feb. 16, 2004.

*Primary Examiner*—Cheryl Tyler
*Assistant Examiner*—William H. Rodriguez
(74) *Attorney, Agent, or Firm*—Connolly Bove Lodge & Hutz LLP; Larry J. Hume (57) ABSTRACT

A nozzle comprising an inner barrel, a centerbody disposed inside the inner barrel so as to define a first channel for a primary flow, and an outer barrel surrounding the inner barrel so as to define a second annular channel for a secondary flow, the free end of the inner barrel presenting a surface having a first series of undulations made up of negative undulations alternating with positive undulations, the centerbody presenting a second series of undulations made up of negative undulations alternating with positive undulations, the negative and positive undulations of the series of undulations being of radial height that varies angularly and being disposed in such a manner that the negative undulations of the first series are disposed facing negative undulations of the second series, and vice versa, so as to generate turbulence and radial shear between the primary and secondary flows while conserving a constant flow section around the entire circumference of the nozzle.

19 Claims, 5 Drawing Sheets

U.S. PATENT DOCUMENTS

| | | | | |
|---|---|---|---|---|
| 4,066,214 | A | * | 1/1978 | Johnson ................. 239/265.19 |
| 4,077,206 | A | * | 3/1978 | Ayyagari ..................... 60/262 |
| 4,117,671 | A | * | 10/1978 | Neal et al. ................... 60/262 |
| 4,240,252 | A | * | 12/1980 | Sargisson et al. ............. 60/262 |
| 4,401,269 | A | * | 8/1983 | Eiler ..................... 239/265.17 |
| 4,543,784 | A | * | 10/1985 | Kirker ......................... 60/262 |
| 4,548,034 | A | * | 10/1985 | Maguire ....................... 60/262 |
| 4,576,002 | A | * | 3/1986 | Mavrocostas ................ 60/262 |
| 4,592,201 | A | * | 6/1986 | Dusa et al. ................... 60/262 |
| 4,696,159 | A | * | 9/1987 | Horgan ...................... 60/226.1 |
| 4,786,016 | A | * | 11/1988 | Presz et al. ................. 244/130 |
| 4,819,425 | A | * | 4/1989 | Farquhar et al. ........... 60/226.1 |
| 5,216,879 | A | * | 6/1993 | Zysmaan ...................... 60/262 |
| 5,638,675 | A | * | 6/1997 | Zysman et al. ............... 60/262 |
| 5,755,092 | A | * | 5/1998 | Dessale et al. ............... 60/262 |
| 5,775,095 | A | * | 7/1998 | Zysman et al. ............... 60/204 |
| 5,924,632 | A | | 7/1999 | Seiner et al. |
| 6,012,281 | A | * | 1/2000 | Hauser ........................ 60/204 |
| 6,082,635 | A | | 7/2000 | Seiner et al. |
| 6,233,920 | B1 | * | 5/2001 | Presz et al. ................... 60/230 |
| 6,276,127 | B1 | * | 8/2001 | Alberti ........................ 60/262 |
| 6,606,854 | B1 | * | 8/2003 | Siefker et al. ................ 60/262 |
| 6,786,038 | B2 | * | 9/2004 | Lair .......................... 60/226.1 |
| 6,804,948 | B2 | * | 10/2004 | Oishi ........................... 60/262 |
| 6,854,260 | B2 | * | 2/2005 | Anderson .................... 60/204 |

FOREIGN PATENT DOCUMENTS

| | | |
|---|---|---|
| FR | 2 529 956 A | 1/1984 |
| WO | WO 00/40851 A | 7/2000 |

* cited by examiner

TURBOMACHINE NOZZLE WITH NOISE REDUCTION

BACKGROUND OF THE INVENTION

The present invention relates to the general field of nozzles fitted to turbomachines. More particularly, it seeks to reduce aerodynamic noise from the jet generated at the outlet of the nozzles of airplane turbomachines that deliver separate flows, and to do so in particular while such an aircraft is taking off.

The nozzles fitted to airplane turbomachines generally comprise a centerbody surrounded by an inner barrel so as to form between them a first annular channel for a primary flow. An outer barrel surrounds the inner barrel so as to form a secondary annular channel for a secondary flow. The primary and secondary flows terminate, prior to being exhausted, in a converging portion, a throat, and a diverging portion. Overall these nozzle components are generally axially symmetrical in shape. The present invention relates more particularly to nozzles in which the centerbody is of the external type, i.e. having a trailing edge which is located downstream from the inner barrel.

The present invention seeks to reduce the jet noise generated at the outlet from such nozzles, in particular while an airplane is taking off, during which time the ejection speed of the primary and secondary flows is highly subsonic, i.e. about Mach 0.9 (high subsonic regime). At such flow speeds, two conditions must be satisfied: firstly it is necessary to conserve constant flow sections in three dimensions both in the neck and in the diverging portion of the nozzle in order to maintain the aerodynamic performance of the nozzle and guarantee flow rate conservation, and secondly it is necessary to maintain constant cross-sections over the entire circumference of the nozzle in order to avoid local zones of excess speed. This second requirement implies that the equivalent axially symmetrical section (as measured at the throat) must remain constant around the entire circumference of the nozzle, in all azimuth section planes. In a high subsonic regime, any local excess speed can lead to loss of aerodynamic performance, or to additional parasitic noise if a shockwave is produced.

In order to reduce the noise of the aerodynamic jet generated at the outlet from a nozzle, it is known to encourage mixing between the primary and secondary flows exiting the turbomachine. For this purpose, U.S. Pat. No. 5,924,632 proposes integrating lobes on the inner and outer barrels, with the free end of the centerbody presenting various possible shapes. Similarly, French patent No. 2 529 956 describes a system for ejecting mixed flows in which the inner barrel is provided with lobes and the centerbody is provided in part with undulations. Applying those technologies to a flow at a high subsonic rate is unsatisfactory. The above-described requirements are not satisfied, and in particular the requirement relating to conserving constant cross-sections around the entire circumference of the nozzle. This leads to local excess speeds which, in the high subsonic regime, generate shock waves which generate additional parasitic noise and which also reduce the aerodynamic performance of the nozzle.

OBJECT AND SUMMARY OF THE INVENTION

The present invention thus seeks to mitigate such drawbacks by proposing a nozzle with separate flows, the nozzle enabling the noise of the jet to be reduced, in particular in a high subsonic regime, by encouraging mixing between the flows by creating shear and turbulence effects, while nevertheless satisfying the requirements to conserve flow rate and cross-sections around the entire circumference of the nozzle.

To this end, the invention provides a turbomachine nozzle comprising: a substantially cylindrical inner barrel extending along a longitudinal axis of the nozzle; a centerbody disposed concentrically inside the inner barrel and extending beyond a free end of the inner barrel in the form of a substantially conical portion so as to define between the inner barrel and the centerbody a first annular channel for receiving a primary flow having a cross-section that is substantially constant around the entire circumference of the nozzle; and an outer barrel concentrically surrounding the inner barrel so as to define a second annular channel for a secondary flow; the free end of the inner barrel presenting a surface having a first series of undulations regularly distributed around the longitudinal axis of the nozzle, the first series of undulations being formed by negative undulations which extend radially inwards relative to the inner barrel, alternating with positive undulations which extend radially outwards relative to the inner barrel. According to the invention, the centerbody presents a second series of undulations at least in a portion facing the undulating surface at the free end of the inner barrel, the second series of undulations being regularly distributed around the longitudinal axis of the nozzle, the second series of undulations being made up of negative undulations extending radially inwards relative to the centerbody, alternating with positive undulations extending radially outwards relative to the centerbody, the negative and positive undulations of the first second series of undulations being of radial height that varies angularly and being disposed in such a manner that the negative undulations of the first series of undulations are disposed facing negative undulations of the second series of undulations, and vice versa, so as to generate turbulence and radial shear between the primary and secondary flows downstream from the undulations, while conserving a constant flow section around the entire circumference of the nozzle.

Thus, including negative and positive undulations on the inner barrel and on the centerbody makes it possible to generate a large amount of mixing between the primary and secondary flows. This large amount of mixing is obtained in particular by radial shear between the flows and by turbulence in the flows where they leave the nozzle. The undulations also make it possible to reduce the flow speeds along the longitudinal axis of the nozzle so as to accentuate mixing at the outlet from the nozzle. Furthermore, the primary and secondary flow rates are conserved and the cross-section remains constant around the entire circumference of the nozzle so that the aerodynamic performance of the nozzle is not affected by the undulations and any risk of local excess speed is avoided.

The undulating surface of the centerbody may extend longitudinally over its entire length or over a fraction only of the conical portion of the centerbody.

When the undulating surface extends over a fraction only of the conical portion of the centerbody, the non-undulating surface of said conical portion may carry a plurality of substantially rectangular arms extending longitudinally beyond a free end of the conical portion of the centerbody in their length direction and radially in their width direction, the arms intersecting on the longitudinal axis of the nozzle. These arms thus enable the amplitude of the radial shear between the primary and secondary flows to be increased.

The arms are preferably of the same length and the same width and disposed symmetrically about the longitudinal axis of the nozzle.

Advantageously, the arms are disposed in line with the negative undulations of the second series of undulations. Downstream from these negative undulations, the primary flow tends to go outwards from the wall of the conical portion of the centerbody, thereby generating radial shear between the flows. The presence of arms in line with the negative undulations enables this outward deflection of the flow to be increased and thus enables the radial shear effect to be increased.

According to an advantageous characteristic of the invention, the arms present means at a free end for generating additional radial shear between the primary and secondary flows. These additional shear means may be longitudinal slots forming an angle with the longitudinal axis of the nozzle and facing downstream therealong. The flow induced in the vicinity of these slots is thus deflected along the slots. Additional radial shear thus occurs between the flow in the vicinity of the slots (flow going away from the longitudinal axis of the nozzle) and the flow situated between the arms (flow going towards the longitudinal axis of the nozzle). The additional shear means may also be in the form of longitudinal fins that also serve to increase the shear in their vicinity and to reduce the speed of the flow along the longitudinal axis of the nozzle downstream from the arms.

According to another advantageous characteristic of the invention, the free end of the inner barrel includes, downstream from the first series of undulations, a series of tongues comprising negative tongues disposed in line with the negative undulations in the first series of undulations alternating with positive tongues disposed in line with the positive undulations in the first series of undulations. These tongues enable the amplitude of the shear between the primary and secondary flows to be increased, in particular at medium and high frequencies. The tongues interfere simultaneously in the primary and secondary flows. The deflections in the flow zones generated in this way beside the primary and secondary flows are the seat of a large amount of radial shear between the flows and strong mixing occurs between the flows between each of the flow zones defined by the tongues. By way of example, the tongues may present rounded U-shaped tips or pointed V-shaped tips.

According to yet another advantageous characteristic of the invention, the undulations of the second series of undulations present angular twist about the longitudinal axis of the nozzle so as to generate swirling in the primary flow. Such swirling together with the shear and the turbulence in the primary and secondary flows further increases mixing at the outlet from the nozzle and thus further reduces the amount of noise that is generated. The undulations in the first series of undulations preferably also present angular twisting that is equivalent to that of the undulations of the second series so as to generate swirling in the primary and secondary flows. Another way of generating swirling in the primary and secondary flows, in accordance with the invention, is to provide the each of the negative positive undulations of the first series of undulations with at least one notch or at least one deflector fin at an angle relative to the longitudinal axis of the nozzle.

BRIEF DESCRIPTION OF THE DRAWINGS

Other characteristics and advantages of the present invention will appear on reading the following description given with reference to the accompanying drawings which show embodiments that has no limiting character. In the figures.

DETAILED DESCRIPTION OF EMBODIMENTS

In conventional manner, a turbomachine (not shown in the figures) comprises a fan rotated by a gas generator placed upstream from the fan. Typically, the gas generator comprises a compressor, a combustion chamber, and a turbine. An inner barrel is placed circularly around the gas generator and a centerbody is secured to the upstream end of the gas generator. The centerbody is disposed concentrically inside the inner barrel so as to define a first annular channel for exhausting the combustion gas from the gas generator. The combustion gas forms the primary flow of the turbomachine. Similarly, a pod or outer barrel is disposed concentrically around the inner barrel. The outer barrel is spaced radially apart from the inner barrel so as to define a second annular channel for exhausting the by pass air from the fan of the turbomachine. The air from the fan constitutes the secondary flow of the turbomachine. The centerbody and the inner and outer barrels of the turbomachine thus form the ejection nozzle of the turbomachine.

Figure 1:
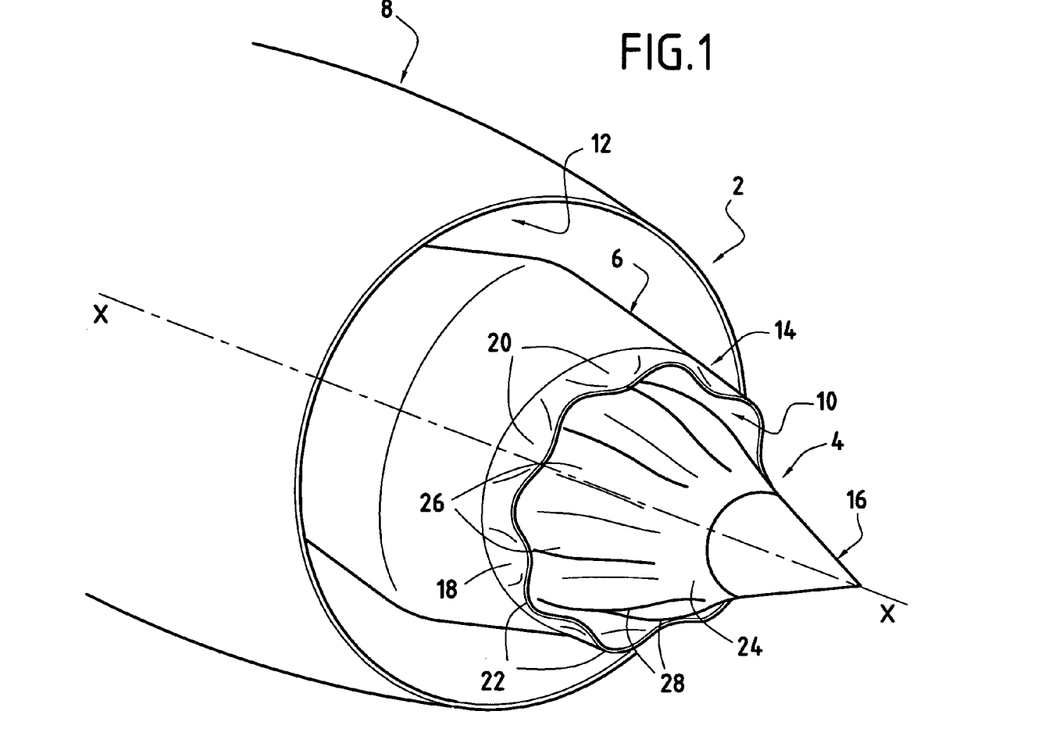
FIG. 1 is a perspective view of a turbomachine nozzle in a first embodiment of the invention.
Figure 2A:
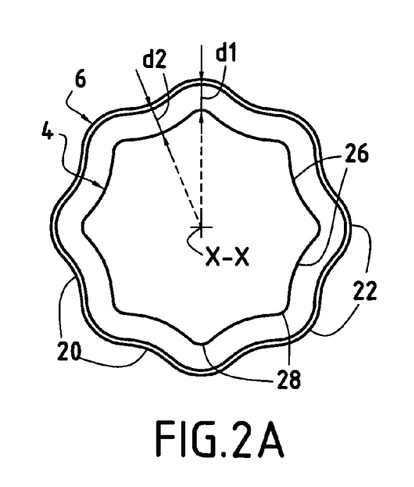
FIGS. 2A and 2B are respectively a cross-section view and a longitudinal section view of the FIG. 1 nozzle.
Figure 2B:
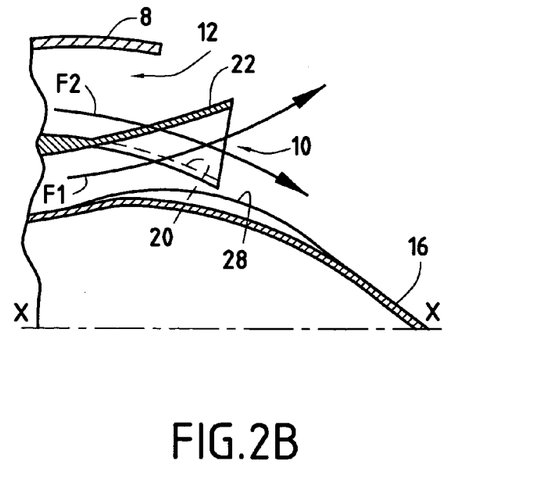

FIGS. 1, 2A, and 2B show a turbomachine nozzle constituting a first embodiment of the invention. As explained above, this nozzle 2 is axially symmetrical in shape about a longitudinal axis X—X, and comprises a centerbody 4, an inner barrel 6, and an outer barrel 8 which are generally cylindrical in shape and are disposed concentrically relative to one another.

In FIG. 1, references 10 and 12 designate respectively the first annular channel for the primary flow and the second annular channel for the secondary flow of the turbomachine. The centerbody 4 of the nozzle is of the external type, i.e. its trailing edge extends longitudinally beyond a free end 14 of the inner barrel 6. It is terminated by a substantially conical portion 16. Furthermore, the outer barrel 8 of the nozzle shown in FIGS. 1 and 2B does not extend over the full length of the inner barrel 6. Nevertheless, the invention can also be applied to a nozzle in which the outer barrel extends over the entire length of the inner barrel, or indeed beyond it.

The exhaust nozzle 2 serves to separate the primary and secondary flows coming from the turbomachine. At the free end 14 of the inner barrel 6, the combustion gases forming the primary flow mix with bypass air from the secondary flow. The axially symmetrical shape of the nozzle tends to generate a high level of noise downstream from the inner barrel, particularly while an airplane is taking off.

The present invention provides a special shape for the centerbody 4 and the inner barrel 6 of the nozzle for the purpose of reducing the noise generated at the nozzle outlet, while nevertheless conserving acceptable aerodynamic performance.

In a first aspect of the invention, the free end 14 of the inner barrel 6 presents a surface 18 having a first series of undulations that are regularly distributed around the longitudinal axis X—X of the nozzle. This first series of undulations is formed by negative undulations 20, preferably eight negative undulations, that project radially inwards relative to the inner barrel 6, and that alternate with the same number of positive undulations 22. These positive undulations extend radially outwards from the inner barrel. As shown in FIG. 1, the folds formed by the first series of undulations taper progressively in the upstream direction going away from the undulating surface 18 so as to return to the original substantially-cylindrical shape of the inner barrel 6.

In another aspect of the invention, the centerbody 4 presents a second series of undulations regularly spaced apart around the longitudinal axis X—X of the nozzle, at least on a portion 24 facing the undulating surface 18 of the free end 14 of the inner barrel 6. This second series of undulations is likewise made up of negative undulations 26 that extend radially inwards relative to the centerbody 4, alternating with positive undulations 28 that extend radially outwards relative to the centerbody. The folds formed in the portion 24 of the centerbody 4 of the nozzle are made in such a manner that the negative undulations 20 in the first series of undulations are located facing negative undulations 26 in the second series of undulations, and vice versa. Similarly, like the folds formed in the inner barrel 6, the folds formed in the portion 24 of the centerbody 4 taper progressively going upstream. In FIG. 1, these same folds also taper going downstream so as to return to the original shape of the conical portion 16 of the centerbody. Nevertheless, it would also be possible for the undulating surface 24 of the centerbody 4 to extend longitudinally over the entire conical portion 16 of the centerbody.

The folds formed in the inner barrel 6 and in the centerbody 4 thus serve to generate, downstream from the undulations, radial shear between the primary and secondary flows. The term "radial shear" is used below to mean that the shear applies in a direction that is radial relative to the substantially-cylindrical shape of the nozzle.

Such radial shear is shown in particular in FIG. 2B where arrows F1 and F2 represent the respective flow directions of the primary and secondary flows. Turbulence between the primary and secondary flows is also generated downstream from the undulating surfaces of the inner barrel and the centerbody. The undulations or folds also tend to reduce the speeds of the primary and secondary flows along the longitudinal axis X—X of the engine at the outlet from the nozzle. Thus, the combined effects of turbulence and radial shear associated with a reduction in the axial speeds of the flows leads to better mixing of the primary and secondary flows and thus leads to a reduction in the noise given off by the jet leaving the nozzle. The amplitude (or radial height) of the folds formed in the inner barrel 6 and the centerbody 4 of the nozzle is optimized so as to limit separation of the flows from the surfaces and avoid any risk of excess speed at the folds.

Still in the invention, it should also be observed, in particular with reference to FIG. 2A, that the positive and negative undulations of the first and second series of undulations present a radial height (or amplitude) that varies angularly around the entire circumference of the nozzle. This characteristic of the invention makes it possible to conserve equivalent cross-sections over the entire circumference of the nozzle. Thus, the radial distance between the undulating surface 18 of the inner barrel 6 and the undulating surface 24 of the centerbody 4 varies around the circumference of the nozzle. In particular, the radial distance d1 between any of the positive undulations 22 of the inner barrel and the facing positive undulation 28 of the centerbody is significantly different from the radial distance d2 between any of the negative undulations 20 of the inner barrel and the corresponding negative undulation 26 of the centerbody. The distances d1 and d2 are selected in such a manner that the rings traced from d1 and d2 present identical flow sections. Furthermore, the outline of the undulations formed in the inner barrel and the centerbody of the nozzle is such that the three-dimensional flow sections at the throat and in the divergent portion of the nozzle are conserved in comparison with a nozzle of axially symmetrical shape.

As a result, the aerodynamic performance of the nozzle is unaffected by these undulations, with the primary and secondary flow rates being conserved and with any risk of local excess speed being avoided, particularly in a high subsonic regime. Tests performed in wind tunnels have shown that the cumulative reduction in noise is about 3.4 decibels (dB) compared with an existing axially symmetrical nozzle having an external centerbody, and is about 5.4 dB compared with an existing axially symmetrical nozzle having an internal centerbody.

Figure 3:
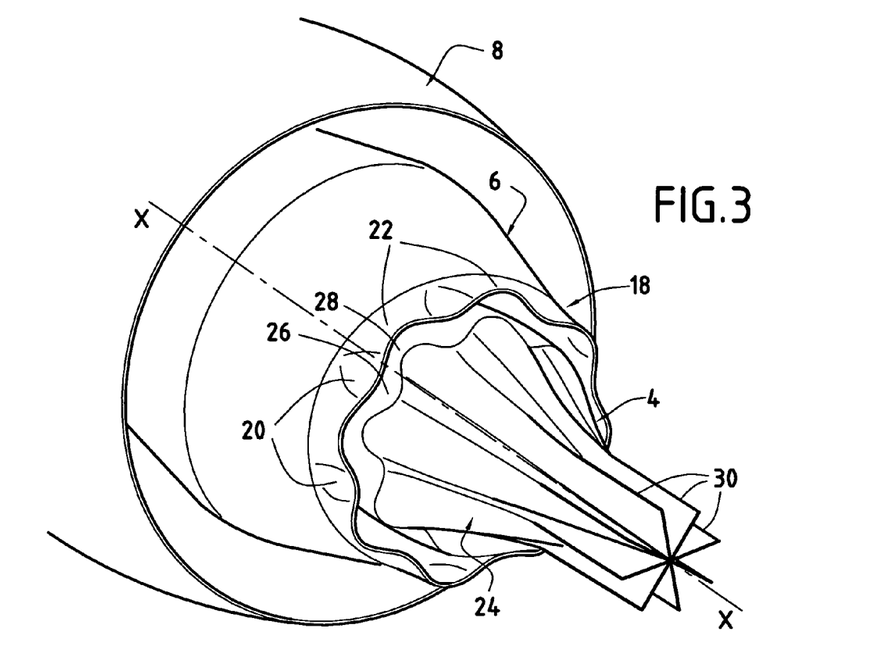
FIG. 3 is a perspective view of a turbomachine nozzle in a second embodiment of the invention.

FIG. 3 shows a second embodiment of a nozzle in accordance with the invention. In this embodiment, the centerbody 4 and the inner barrel 6 of the nozzle have the same undulating surfaces 18, 24 as the nozzle shown in FIG. 1. In particular, the undulating surface 24 of the centerbody 4 extends only part of the way longitudinally over the conical portion of the centerbody.

In this embodiment, the non-undulating surface of the conical portion of the centerbody 4, i.e. the terminal portion thereof, carries a plurality of arms 30 for increasing the amplitude of the radial shear between the primary and secondary flows. These arms 30 are substantially rectangular in shape: firstly they extend longitudinally in their long direction beyond a free end of the conical portion 16 of the centerbody 4, and secondly they extend radially in their width direction. The arms intersect on the longitudinal axis X—X of the nozzle and they are advantageously all of the same length and of the same width. Furthermore, they are preferably symmetrical about the longitudinal axis X—X of the nozzle and of relatively small thickness compared with their other dimensions so as to avoid degrading the aerodynamic performance of the nozzle.

The number of arms 30 may be independent of the number of folds formed in the centerbody 4, and their angular (or azimuth) disposition may vary, where appropriate. Nevertheless, it appears to be advantageous for the arms 30 to be positioned so that they extend the negative undulations 26 of the centerbody 4, with the number of arms then being proportional to the number of undulations.

This particular disposition is shown in FIG. 3: at its undulating surface 24, the centerbody 4 has eight negative undulations 26, and at its non-undulating surface, it has eight arms 30 that are disposed symmetrically about the longitudinal axis X—X and in line with the negative undulations.

Such an arrangement presents the advantage of significantly increasing the radial shear generated downstream from the nozzle and thus of contributing to reducing the noise generated at the outlet from the nozzle, in particular the low frequency noise (by significantly reducing axial speed downstream from the centerbody). Downstream from the negative undulation 26 of the centerbody 4, the primary and secondary flows tend to go away from the longitudinal axis X—X of the nozzle, thereby leading to radial shear between the flows. The arms 30 disposed in line with these negative undulations thus contribute to accentuating this shear. It should also be observed that in the angular sectors defined between the arms, additional turbulence is created between the arms, which combine with the shear effect to contribute to reducing noise.

Figure 4:
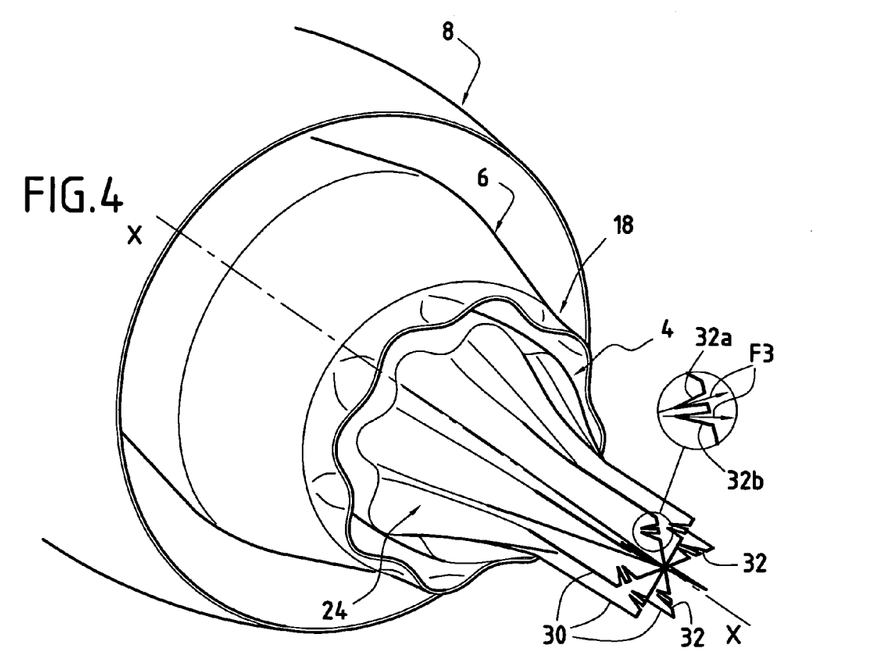
FIGS. 4 and 5 are perspective views of the FIG. 3 nozzle showing two variants thereof.
Figure 5:
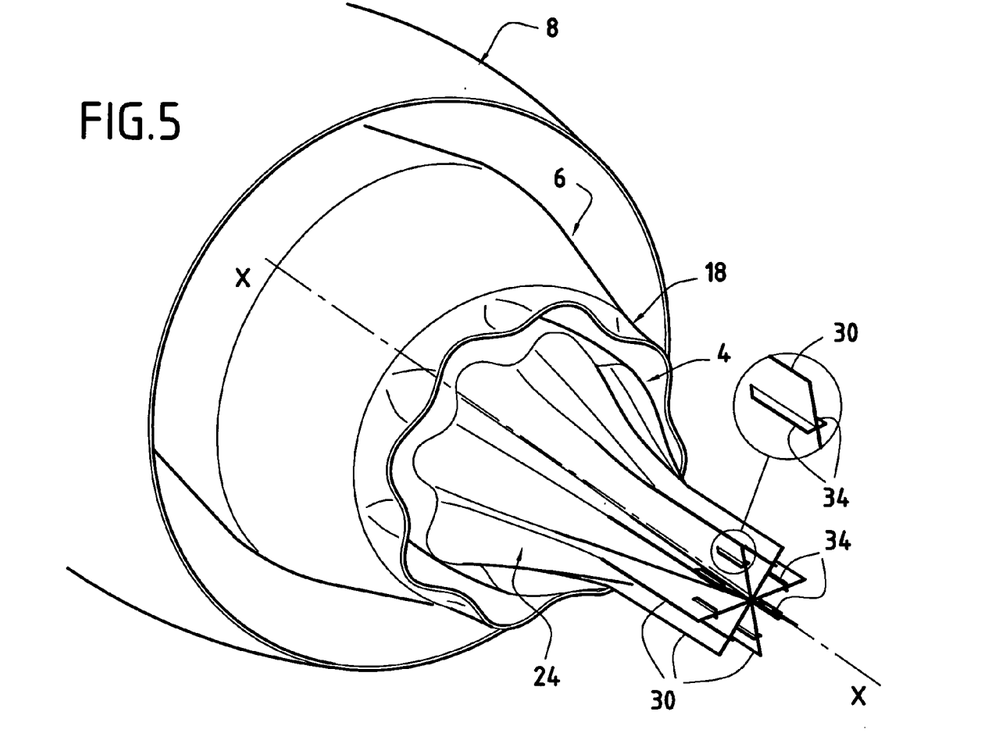
Figure 6A:
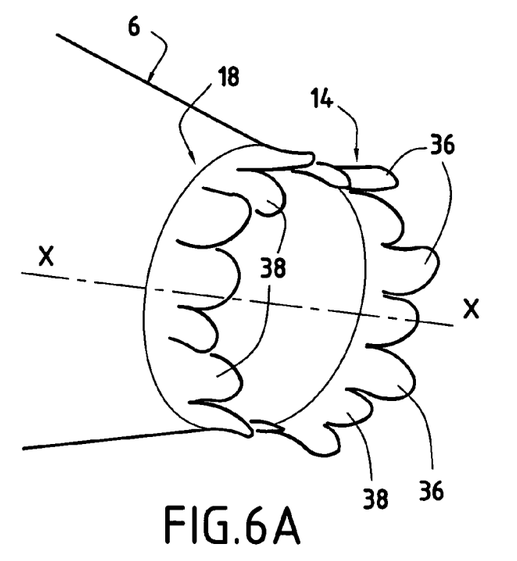
FIGS. 6A and 6B are respectively a perspective view and a cross-section view of the inner barrel of a nozzle constituting a third embodiment of the invention.
Figure 6B:
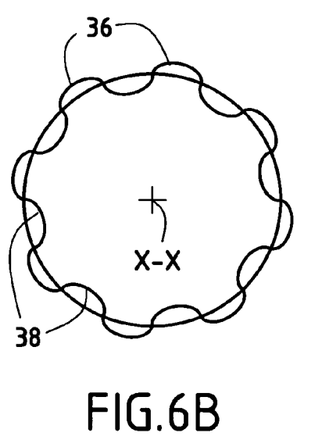

In two variants of this second embodiment of the invention as shown in FIGS. 4 and 5, it is also possible to provide, on the trailing edges of the arms 30, means that enable additional radial shear to be generated between the primary and secondary flows, while simultaneously reducing axial speed downstream from the centerbody.

In the variant shown in FIG. 4, longitudinal slots or notches 32 are thus formed in the free ends of the arms 30. These slots 32 are at an angle relative to the longitudinal axis X—X of the nozzle. In order to avoid flow separation occurring in the divergent portion of the nozzle, this angle may lie, for example, in the range 0° to 5°. Furthermore, this angle is directed downstream from the nozzle, i.e. outwards from the longitudinal axis X—X of the nozzle. The flow F3 imparted to the primary and secondary flows in the vicinity of the slots 32 is thus channeled in the slot direction. As a result, additional radial shear is generated in the vicinity of the trailing edges of the arms 30 between the flow induced in the vicinity of the arms (flow going away from the longitudinal axis X—X of the nozzle) and that situated between the arms (flow going towards the longitudinal axis X—X). It should also be observed, that in addition to generating additional radial shear, the presence of these slots makes it possible to decrease the axial speed distribution in the primary and secondary flows downstream from the nozzle centerbody.

The number, the shape, the length, and the diverging angle from the longitudinal axis X—X of the slots 32 may also vary depending on circumstances. In the example of FIG. 4, each of the arms 30 thus presents at least four slots 32 disposed in pairs symmetrically about the longitudinal axis X—X of the nozzle. In this case, it is preferable to incline the slots 32a that are further from the longitudinal axis X—X at an angle that is greater than the angle of the slots 32b closer to said longitudinal axis. This advantageous characteristic enables the flow induced in said zone to be deflected gradually, thus enabling flow separation to be avoided.

Alternatively, the means enabling additional radial shear to be generated can be implemented in the form of plurality fins 34 as shown in FIG. 5. In their width direction, these fins 34 are disposed perpendicularly to the arms 30. In their length direction, the fins may be parallel to the longitudinal axis X—X or they may be inclined relative thereto by a diverging angle of no more than 5°.

The number, the length, the width, the location on the arms, and the profile of the fins 34 may vary depending on circumstances. In particular, the fins 34 may be situated at the free ends of the arms 30 or they may extend over the entire length of the arms in order to increase the thickness thereof artificially, thereby accentuating radial shear. In the example of FIG. 5, each of the arms 30 presents at least two fins 34 disposed symmetrically about the longitudinal axis X—X of the nozzle.

The function of the fins 34 is identical to the function of the above-described slots: they enable additional radial shear to be generated and they also serve to reduce the axial speed of the flows downstream from the centerbody of the nozzle under the same conditions as the slots. However, they present a wetted area that is much greater than that of the slots, thereby enabling radial shear to be increased.

Reference is now made to FIGS. 6A, 6B, and 7A, 7B which show part of a nozzle constituting a third embodiment of the invention. For reasons of clarity, only the inner barrel 6 of the nozzle is shown in these figures. Naturally, the centerbody and the outer barrel continue to present undulating surfaces in accordance with the general principle of the invention as described with reference to FIG. 1. Thus, the free end 14 of the inner barrel 6 in this embodiment of the invention presents a surface 18 having the first series of undulations (this series of undulations is nevertheless not shown in FIGS. 6A and 7A). In addition, the centerbody may include arms optionally fitted with slots or fins as shown in FIGS. 3 to 5.

Figure 7A:
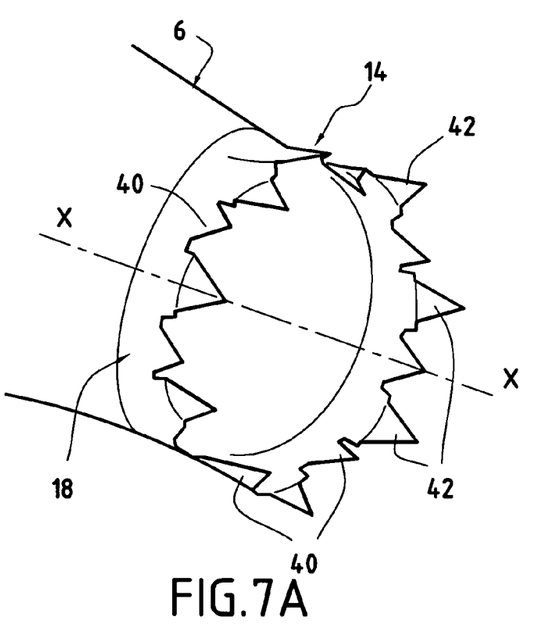
FIGS. 7A and 7B are respectively a perspective view and a cross-section view of the inner barrel of a nozzle constituting a variant of the third embodiment of the invention.
Figure 7B:
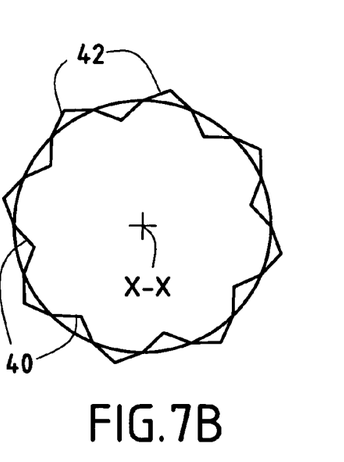

In this third embodiment of the invention, the free end 14 of the inner barrel includes a series of tongues downstream from the first series of undulations, the tongues comprising negative tongues 36, 40 disposed in line with the negative undulations in the first series of undulations alternating with positive tongues 38, 42 disposed in line with the positive undulations in the first series of undulations. As a result, the negative tongues 36, 40 extend radially inwards relative to the inner barrel while the positive tongues 38, 42 extend radially outwards relative to the inner barrel. The number of tongues thus corresponds to the number of undulations in the inner barrel. In addition, the tongues are of varying shapes: the free ends of the tongues may be rounded, for example, so as to form negative and positive U-shapes 36 and 38 (FIGS. 6A, 6B), or they may be pointed so as to form negative and positive V-shapes 40 and 42 (FIGS. 7A, 7B).

The tongues as provided in this way on the trailing edge of the inner barrel 6 of the nozzle serve to increase the amplitude of the radial shear between the primary and secondary flows, and thus to accentuate the noise reduction generated at the outlet from the nozzle, particularly at medium and high frequencies (by increasing mixing between the flows outside the axial zone of the jet). These tongues interfere simultaneously with the primary and secondary flows. The inward and outward deflections of the flows are consequently significantly increased compared with a surface that is merely undulating, and the wetted area is reduced compared with undulations extending as far as the tongues. This thus enables aerodynamic friction losses to be reduced. The primary and secondary flow deflections thus constitute the seat of significant radial shear between the flows, thereby increasing mixing between each of the flow zones defined by the tongues.

In addition, since the tongues are disposed so as to extend the undulations, any problem associated with slope interruption that might lead to flow separation are avoided. It should also be observed that the use of U-shapes presents two advantages over V-shapes: firstly the wetted area is greater, thereby achieving greater flow deflection, and secondly the use of U-shapes is safer while manual interventions are being performed.

Figure 8:
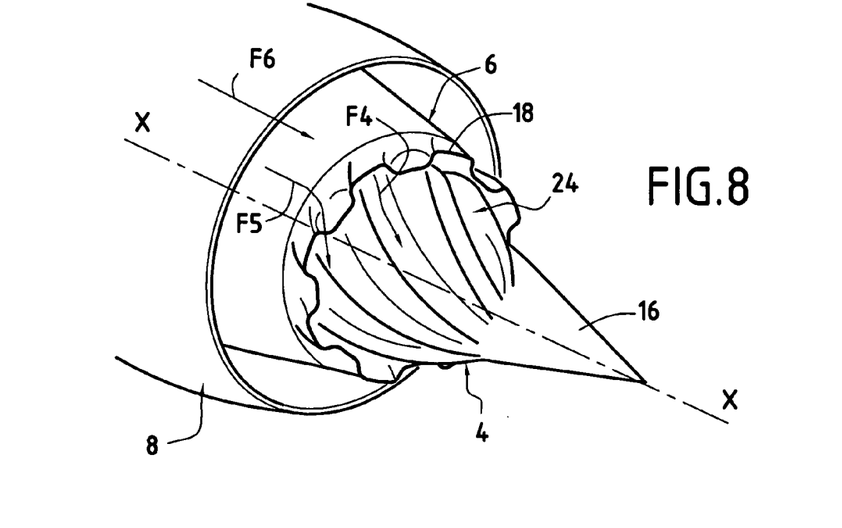
FIG. 8 is a perspective view of a nozzle in a fourth embodiment of the invention.

In a fourth embodiment of the invention as shown in FIG. 8, angular twisting or azimuth bending is introduced in the first and second series of undulations so as to cause the primary and secondary flows to swirl to the outlet from the nozzle.

In FIG. 8, it can be seen that the positive and negative undulations of the undulating surfaces 18 and 24 of the inner barrel 6 and of the centerbody 4 are subjected to the same angular twisting about the longitudinal axis X—X of the nozzle. The angular twisting of the undulating surfaces 18 and 24 can be implemented, for example, in the direction opposite to that of the incident flow leaving the turbine case arm of the turbomachine.

Thus, in FIG. 8, streams F4 and F5 of the primary and secondary flows along the inner barrel 6 and the centerbody 4 of the nozzle are subjected to swirling in the direction opposite to the incident flow leaving the turbine case arms (not shown). This stream swirling effect increases the shear effect between the primary and secondary flows and increases the phenomenon of turbulence downstream from the nozzle. When the undulating surfaces of the inner barrel and the centerbody do not present any angular twisting (as in FIG. 1 for example), then the primary and secondary flows remain generally directed along the longitudinal axis X—X of the nozzle.

In FIG. 8, the undulating surfaces 18 and 24 of the inner barrel and of the centerbody of the nozzle are twisted so as to induce swirling in the primary and secondary flows. A consequence of such swirling is to generate not only the radial shear induced by the undulations, but also a zone of tangential shear between the primary and secondary flows and the flow of air outside the nozzle, which flow is directed, as represented by arrow F6, along the longitudinal axis X—X of the nozzle. The term "tangential shear" is used to mean shear which acts in a direction that is tangential relative to the substantially cylindrical shape of the nozzle.

In addition, in FIG. 8, the angular twisting is applied both to the undulating surface 18 of the inner barrel 6 and to the undulating surface 24 of the centerbody 4. Nevertheless, it is also possible to envisage having angular twisting applied only to the undulating surface 24 of the centerbody 4 of the nozzle. Under such circumstances (not shown in the figures), in order to maintain flow sections, it is necessary for the angular twisting of the centerbody 4 to begin at the exhaust section of the inner barrel 6. The angular twisting is then generated only in the primary flow, the secondary flow being directed along the longitudinal axis of the nozzle. This embodiment thus serves to create a zone of tangential shear between the primary and secondary flows.

Figure 9:
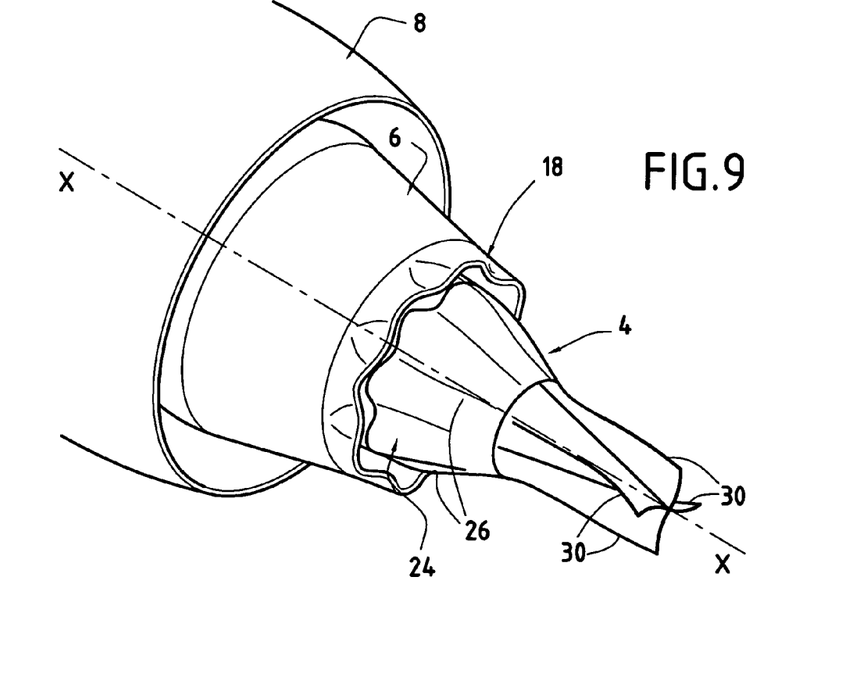
FIG. 9 is a perspective view of a nozzle in a fifth embodiment of the invention.

In a fifth embodiment as shown in FIG. 9, it is also possible starting from a nozzle configuration having arms 30 on the centerbody as described above, to cause said arms to present angular twisting.

In FIG. 9, the centerbody 4 has two perpendicular arms 30 each disposed to extend negative undulations 26 in the centerbody. Each of these arms presents angular twisting. Thus, the primary flow adhering to the centerbody 4 is subjected to swirling that generates additional turbulence downstream from the nozzle. Tangential shear will also occur between the swirling primary flow and the secondary flow which is directed along the longitudinal axis X—X of the nozzle. These two effects (shear and turbulence) combine to generate strong attenuation of aviation noise. Tests performed in a wind tunnel have shown that the cumulated reduction in noise is about 3.8 dB compared with an existing axially symmetrical nozzle having an external centerbody, and about 5.8 dB compared with an existing axially symmetrical nozzle with an internal centerbody.

Furthermore, it is also possible to provide arms having two angular twists: a first twist in a clockwise direction followed by a second twist in the opposite direction. The oppositely-directed bends in the arms will then give rise in the immediately adjacent flow to swirling in both possible directions, thereby significantly increasing the turbulence effect.

Figure 10:
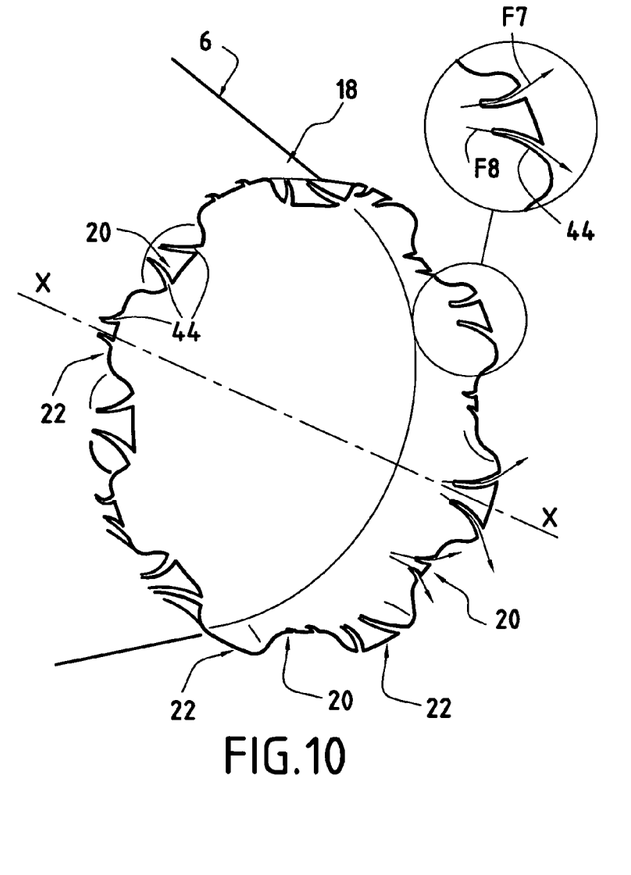
FIG. 10 is a perspective view of the inner barrel of a nozzle in a sixth embodiment of the invention.
Figure 11:
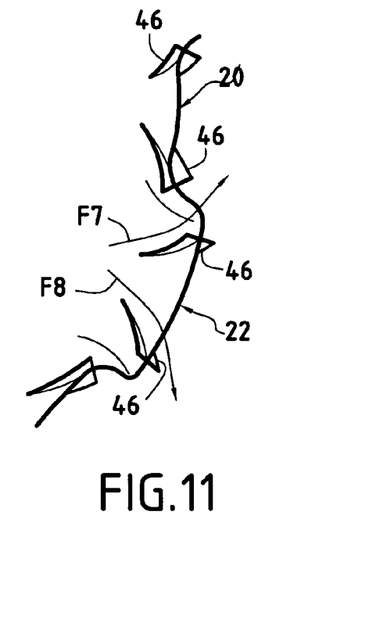
FIG. 11 is a fragmentary perspective view of a variant of the FIG. 10 inner barrel.

FIGS. 10 and 11 show an inner barrel 6 of a nozzle in a sixth embodiment of the invention. For reasons of clarity, only the inner barrel 6 of the nozzle is shown in these figures. Naturally, the centerbody continues to present a surface that undulates in accordance with the general principle of the invention as described with reference to FIG. 1.

In FIG. 10, each negative and positive undulation 20 and 22 of the undulating surface 18 of the inner barrel 6 of the nozzle includes notches 44 at an angle with the longitudinal axis X—X of the nozzle. These notches 44 (two per undulation in FIG. 10) serve to direct the flow induced in the vicinity thereof outwards away from the longitudinal axis with angular deflection. The flow induced in the vicinity thereof is thus "channeled" along the notches and constitutes the seat of swirling motion that interferes with the adjacent flows.

FIG. 11 shows only part of the inner barrel, with the notches being replaced by deflector fins 46 likewise angled relative to the longitudinal axis X—X of the nozzle. As with the notches, these deflector fins 46 (two per undulation in FIG. 11) serve to generate a swirling effect in the flows induced in the immediate vicinity thereof. Nevertheless, deflector fins present a wetted surface area that is greater than that of notches so the swirling effect is more effective than with notches.

Furthermore, in FIGS. 10 and 11, the two notches 44 or deflector fins 46 per undulation are inclined relative to the longitudinal axis X—X in two opposite directions F7 and F8. This characteristic serves to generate swirling zones in these two directions so that a suction zone is created between the two swirling zones. This suction zone encourages mixing between the flows downstream from the inner barrel.

The present invention thus serves to decrease significantly the noise generated at the outlet from the nozzle by encouraging mixing between the primary and secondary flows from the turbomachine. This large amount of mixing is obtained by creating radial and tangential shear between the primary and secondary flows and by acting on the turbulence and the axial speed of the flows.

Furthermore, it is possible to combine the various characteristics shown in FIGS. 1 to 11 in order to obtain a wide variety of possible nozzle shapes. To this end, it should be observed in particular that the various arrangements provided on the trailing edge of the centerbody of the nozzle serve to act on the low frequencies of the noise generated at the outlet from the nozzle, whereas the various characteristics provided on the trailing edge of the inner barrel have influence on the medium and high frequencies.

What is claimed is:

1. A turbomachine nozzle comprising:
a substantially cylindrical inner barrel extending along a longitudinal axis of said nozzle;
a centerbody disposed concentrically inside said inner barrel and extending beyond a free end of said inner barrel in the form of a substantially conical portion so as to define between said inner barrel and said centerbody a first annular channel for receiving a primary flow having a cross-section that is substantially constant around the entire circumference of said nozzle; and an outer barrel concentrically surrounding said inner barrel so as to define a second annular channel for a secondary flow;

said free end of the inner barrel presenting a surface having a first series of undulations regularly distributed around said longitudinal axis of the nozzle, said first series of undulations being formed by negative undulations which extend radially inwards relative to said inner barrel, alternating with positive undulations which extend radially outwards relative to said inner barrel;

wherein said centerbody presents a second series of undulations at least in a portion facing said undulating surface at the free end of the inner barrel, said second series of undulations being regularly distributed around said longitudinal axis of the nozzle, said second series of undulations being made up of negative undulations extending radially inwards relative to said centerbody, alternating with positive undulations extending radially outwards relative to said centerbody, said negative and positive undulations of said first and second series of undulations being of radial height that varies angularly and being disposed in such a manner that the negative undulations of said first series of undulations are disposed facing negative undulations of said second series of undulations, and vice versa, so as to generate turbulence and radial shear between said primary and secondary flows downstream from said first and second series of undulations, while conserving a constant flow section around the entire circumference of said nozzle.

2. A nozzle according to claim 1, wherein the undulating surface of the centerbody extends longitudinally over the entire conical portion of said centerbody.

3. A nozzle according to claim 1, wherein the undulating surface of the centerbody extends longitudinally over part of the conical portion of said centerbody.

4. A nozzle according to claim 3, wherein a non-undulating surface of the conical portion of the centerbody includes a plurality of substantially rectangular arms enabling the amplitude of the radial shear between said primary and secondary flows to be increased, said arms extending longitudinally beyond a free end of said conical portion of the centerbody in the length direction thereof and radially in the width direction thereof, the arms intersecting on said longitudinal axis of the nozzle.

5. A nozzle according to claim 4, wherein said arms are of the same length and of the same width, and are symmetrical about the longitudinal axis of said nozzle.

6. A nozzle according to claim 4, wherein said arms are disposed in line with negative undulations of the second series of undulations.

7. A nozzle according to claim 4, wherein said arms present means at a free end for generating additional radial shear between said primary and secondary flows.

8. A nozzle according to claim 7, wherein said additional shear means are longitudinal slots forming an angle relative to the longitudinal axis of said nozzle and facing downstream therefrom.

9. A nozzle according to claim 8, wherein each of said arms presents at least four slots disposed in pairs symmetrically about the longitudinal axis of said nozzle, the slots further from said longitudinal axis forming an angle relative thereto that is greater than the angle formed by the slots closer to said longitudinal axis of the nozzle.

10. A nozzle according to claim 7, wherein said additional shear means are longitudinal fins disposed perpendicularly to the arms.

11. A nozzle according to claim 10, wherein each of said arms presents at least two fins disposed symmetrically about the longitudinal axis of said nozzle.

12. A nozzle according to claim 4, wherein said arms present at least one angular twist relative to said longitudinal axis of the nozzle so as to generate swirling in the primary flow.

13. A nozzle according to claim 1, wherein said free end of the inner barrel includes a series of tongues downstream from said first series of undulations, said tongues enabling the amplitude of the radial shear between said primary and secondary flows to be increased, said series of tongues being made up of negative tongues disposed in line with negative undulations of said first series of undulations, alternating with positive tongues disposed in line with positive undulations of said first series of undulations.

14. A nozzle according to claim 13, wherein the free ends of said negative and positive tongues are rounded so as to form U-shapes.

15. A nozzle according to claim 13, wherein the free ends of said negative and positive tongues are pointed so as to form V-shapes.

16. A nozzle according to claim 1, wherein the undulations of said second series of undulations presents angular twist relative to said longitudinal axis of the nozzle so as to generate swirling in the primary flow.

17. A nozzle according to claim 16, wherein the undulations of said first series of undulations present angular twisting equivalent to that of the undulations of said second series of undulations relative to said longitudinal axis of the nozzle.

18. A nozzle according to claim 1, wherein each of the negative and positive undulations of the first series of undulations include at least one notch or at least one deflector fin forming an angle relative to the longitudinal axis of said nozzle so as to generate swirling in the primary and secondary flows.

19. A nozzle according to claim 1, wherein each of said first and second series of undulations is formed by eight negative undulations alternating with eight positive undulations.

* * * * *